(12) United States Patent
Hanlon

(10) Patent No.: US 8,220,816 B2
(45) Date of Patent: Jul. 17, 2012

(54) LOCKABLE ROLLER-PEG FOR MOUNTING ON VARIOUS AXLE TYPES, FOR TRICK BIKE GRINDING

(76) Inventor: Kevin F. Hanlon, Prosser, WA (US)

( * ) Notice: Subject to any disclaimer, the term of this patent is extended or adjusted under 35 U.S.C. 154(b) by 317 days.

(21) Appl. No.: 11/251,377

(22) Filed: Oct. 14, 2005

(65) Prior Publication Data

US 2007/0085299 A1    Apr. 19, 2007

(51) Int. Cl.
*B62J 25/00* (2006.01)
(52) U.S. Cl. .................... 280/291; 280/288.4
(58) Field of Classification Search .......... 280/291, 280/288.4, 165; 74/564; 301/110.5, 124.1
See application file for complete search history.

(56) References Cited

U.S. PATENT DOCUMENTS

| | | | |
|---|---|---|---|
| 615,533 A * | 12/1898 | Demory | 280/291 |
| 625,368 A | 5/1899 | Thompson | |
| 3,484,829 A | 3/1968 | Erickson | |
| 5,524,918 A | 6/1996 | Peabody et al. | |
| 5,884,983 A | 3/1999 | Wu | |
| 6,070,897 A | 6/2000 | Hsieh et al. | |
| 6,199,887 B1 | 3/2001 | Lee | |
| 6,247,761 B1 | 6/2001 | Lin | |
| 6,485,044 B1 | 11/2002 | Blake | |
| 6,499,378 B1 * | 12/2002 | Ho | 74/564 |
| 6,863,292 B1 * | 3/2005 | Paasch et al. | 280/291 |

\* cited by examiner

*Primary Examiner* — Anne Marie M Boehler
(74) *Attorney, Agent, or Firm* — Floyd E. Ivey

(57) ABSTRACT

A novel peg apparatus adapted for mounting onto various axles types (e.g. bicycle wheel, conveyor systems, internal machine parts). The device provides either fixed or roller action as preferred by the user. The roller action affords enhanced operating performance and safety in terms of end user satisfaction in each area of potential use. The peg includes an outer sheath made of one of a number of an industrial grade plastic which rotates around the threaded, fixed, mandrel and glides over various surfaces or, which may be locked in a static position to provide a skidding, or "grinding" effect.

9 Claims, 5 Drawing Sheets

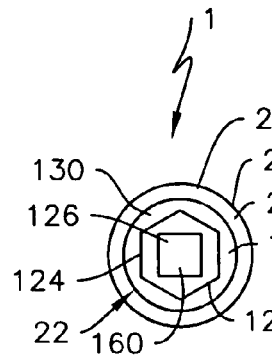
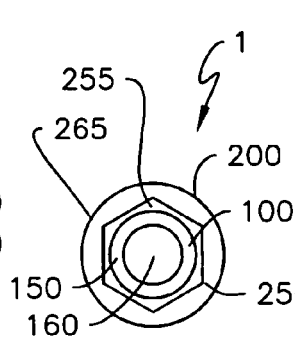
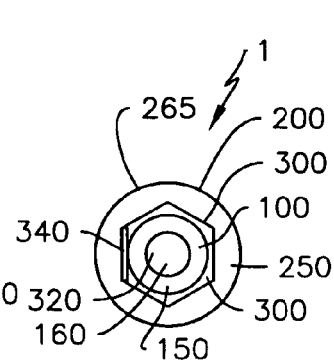
Fig. 3  Fig. 4  Fig. 5
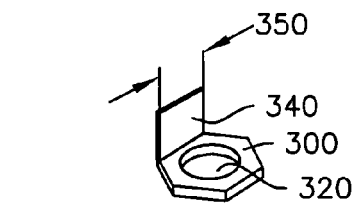
Fig. 6
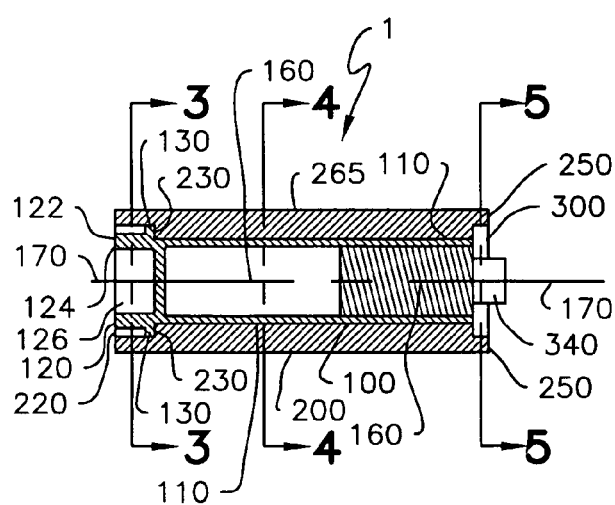
Fig. 2
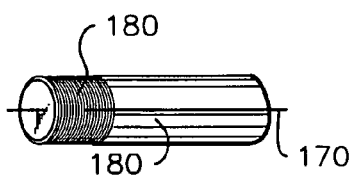
Fig. 6A

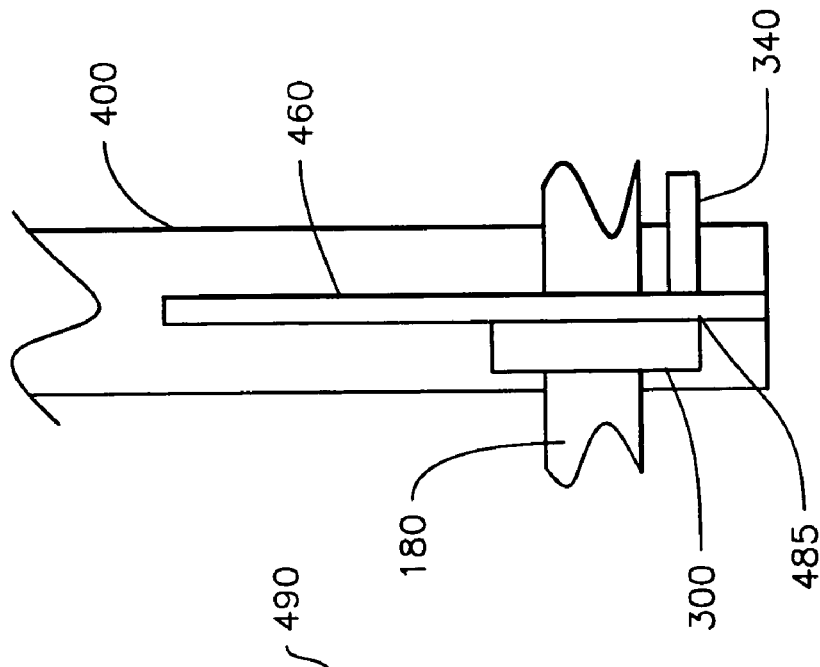
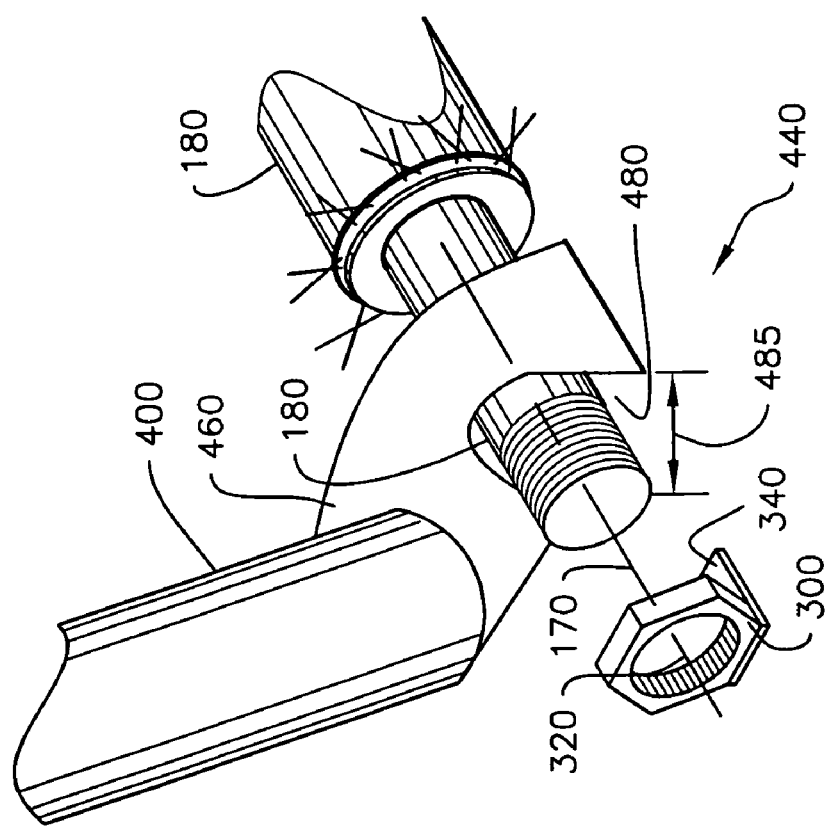
Fig. 8
Fig. 9

LOCKABLE ROLLER-PEG FOR MOUNTING ON VARIOUS AXLE TYPES, FOR TRICK BIKE GRINDING

FIELD OF THE INVENTION

The present invention relates to bicycle roller-pegs and more particularly to lockable roller-pegs for trick bike grinding.

BACKGROUND OF THE INVENTION

BMX bicycling, street and vert or vertical bicycle trick riding commenced in about the early 1990's. Roller-pegs, affixed to bicycle axles, become a means by which bicycle tricks are facilitated.

The practice and application of "grinding" is common in both adolescents and adult street bicycle trick riding as seen at X-Games "Street" and vertical or "Vert" riding events and as witnessed at many city skate and bicycle parks on bicycles. For performing this stunt, typically a cylindrical metal tube peg is secured to the bicycle axles extending outward laterally about four inches. With the bicycle in motion, the rider steers the bicycle so as to ride the pegs onto various surface edges. After traversing the length of the selected surface the rider steers the bicycle back to another rideable surface.

The act of grinding using metal pegs with a bicycle has been around since about 1993. Since then there have been attempts to create a rolling peg, These relied on internal steel bearings, mechanical locks, were poorly constructed, very heavy and proved unacceptable to the stunt riding public. Other current peg designs do not offer the choice of a rolling peg surface. Current popular designs are fixed pegs that slide along and/or grind against the surface the peg is applied to. This grinding action limits both speed and distance, while contributing to tremendous wear on both the peg and surface the peg is grinding on. Typically, such pegs have been constructed of mild steel or metal alloys, enabling them to endure much of the imposed wear forces. The surfaces used for grinding very often are not covered by metal and the act of grinding imposes significant damage to these surfaces. The outer most edge of metal tube pegs wear and sharpen thus creating a very dangerous condition from which many riders sustain lacerating or puncture hole (cookie cutter like) injuries. Bicycle roller-pegs are known in the prior art as seen in the following patents: U.S. Pat. No. 625,368 to Thompson; U.S. Pat. No. 3,484,829 to Erickson; U.S. Pat. No. 5,524,918 to Peabody et al.; U.S. Pat. No. 5,884,983 to Wu; U.S. Pat. No. 6,070,897 to Hsieh et al.; U.S. Pat. No. 6,161,859 to Cheng; U.S. Pat. No. 6,199,887 to Lee; U.S. Pat. No. 6,247,761 to Lin; U.S. Pat. No. 6,485,044 to Blake.

The patents referred to herein are provided herewith in an Information Disclosure Statement in accordance with 37 CFR 1.97.

SUMMARY OF THE INVENTION

This invention is a grinding or roller peg for a bicycle for use during stunt riding and grinding. This invention provides improved static or rolling functionality for adaptation to various non-motorized or motorized cycling sports, skating sports, sports in general, and various industrial machine applications. More specifically, this invention relates to roller peg construction to afford increased performance and reduced wear as compared to such pegs of the prior art.

The peg is generally cylindrical having a metal mandrel adapted for axle mounting, an outer plastic cover for rolling, sliding, skidding, or grinding; and a shaped metal drop out key (70) or washer to fix static or allow the plastic cover to roll or grinding against various selected surface.

The peg is installed by placing of the outer plastic cover over the metal mandrel and threading the female mandrel end to a threaded male bicycle wheel axle. At the operator's option, the peg may be used in a rolling or fixed static configuration. To affect the rolling configuration, the shaped metal drop-out key is removed and a round washer is placed between the plastic sleeve and the axle before installation. The round washer acts as a spacer between the mandrel and the bicycle frame thus affecting the rolling mode. During the fixed static configuration, the shaped metal drop out key is fitting into the receiving shaped dropout slot in the axle end of the outer plastic cover. The female end of the fixed roller peg assembly is then threaded onto the male bicycle wheel axle allowing the shaped metal drop-out key to slide into the bicycle frame axle drop-out slot. The peg assembly is then threaded onto the axle and securely tightened to the bicycle axle.

In accordance herewith, the construction of this invention affords distinct advantages in the form of enhanced operating performance and reduced wear as compared to peg constructions presently known. The above noted features and advantages of this invention as well as other superior aspects thereof will be further appreciated by those skilled in the art upon reading the detailed description which follows in conjunction with the drawings.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 2 is a section from FIG. 7 illustrating the roller peg (1) with mandrel (100) showing the mandrel surface (110), mandrel first end (120), mandrel socket cap (122) mandrel hex nut (124), mandrel socket drive (126), mandrel flange (130), mandrel second end (150), nut (300), mandrel threaded bore (160), mandrel axis (170), cover bearing (200), cover bearing first end (220), cover bearing aperture shoulder (230), cover bearing second end (250), cover bearing outer surface (265) and drop out key (340). Also seen is the threaded axle (180) and mandrel axis (170).

FIG. 3 illustrates the roller peg (1), the mandrel (100), mandrel first end (120), mandrel socket cap (122), mandrel hex nut (124), mandrel socket drive (126), mandrel flange (130), cover bearing (200), cover bearing first end (220) and cover bearing outer surface (265).

FIG. 4 shows the roller peg (1) illustrating the mandrel second end (150), mandrel threaded bore (160), cover bearing (200), cover bearing second end (250), cover bearing hex recess (255) and cover bearing outer surface (265).

FIG. 5 illustrates the roller peg (1) showing the mandrel (100), mandrel second end (150), mandrel threaded bore (160), cover bearing (200), cover bearing second end (250), cover bearing outer surface (265), nut (300), nut aperture (320) and drop out key (340).

FIG. 6 shows the nut (300), nut aperture (320), drop out key (340) and drop out key width (350).

FIG. 6A shows the nut (300) without a drop out key (340).

FIG. 8 illustrates the bicycle frame or fork means (400), bracket means (460), slot means (480), slot width (485), nut (300) and axle (180).

FIG. 9 is a front elevation of the nut (300) received at the drop out key (340) by the slot means (480) at the slot width (485).

DETAILED DESCRIPTION

Figure 1:
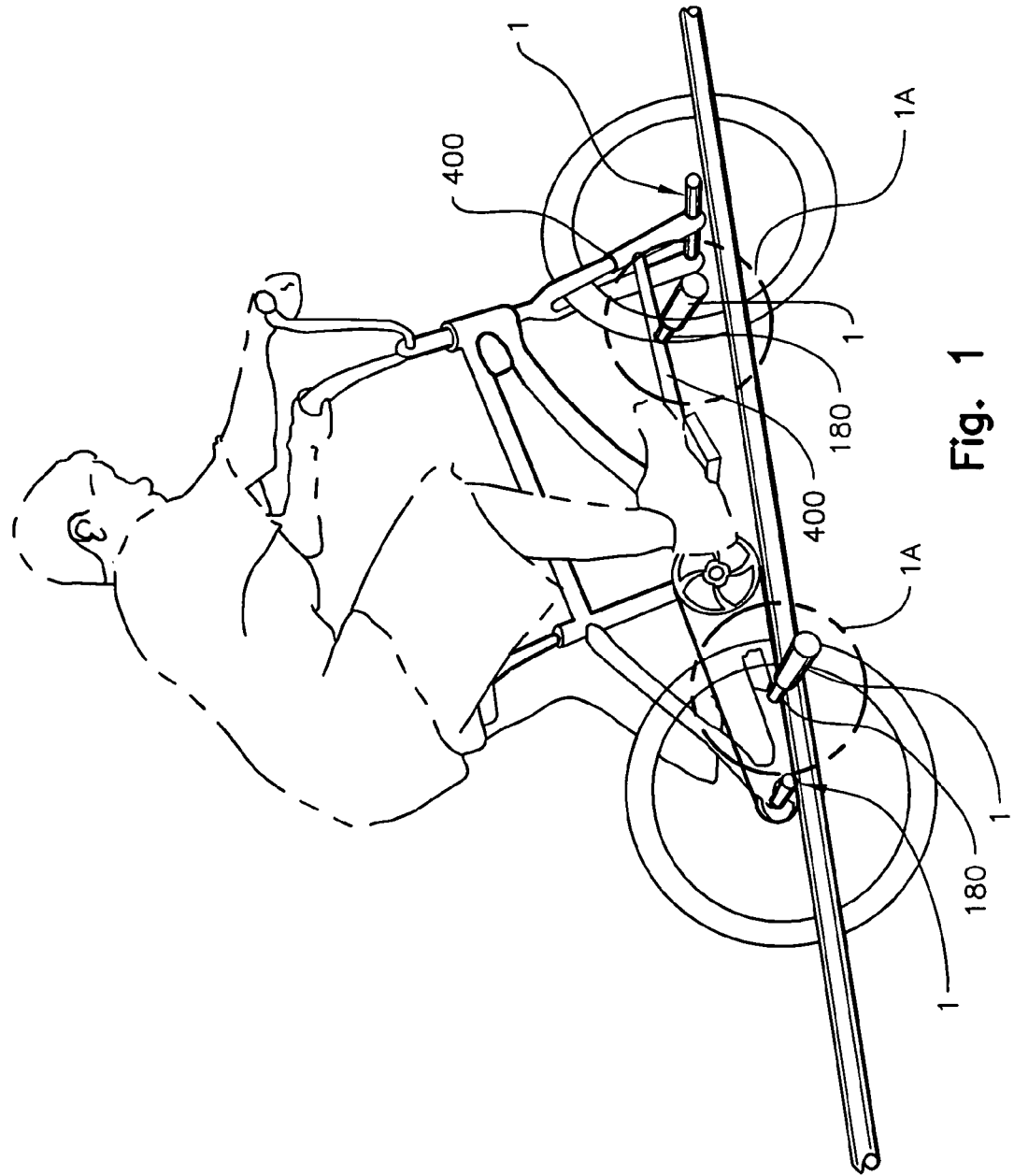
FIG. 1 depicts a bicycle with roller-pegs (1) illustrating frame or fork means (400) and axle means (180).
Figure 1A:
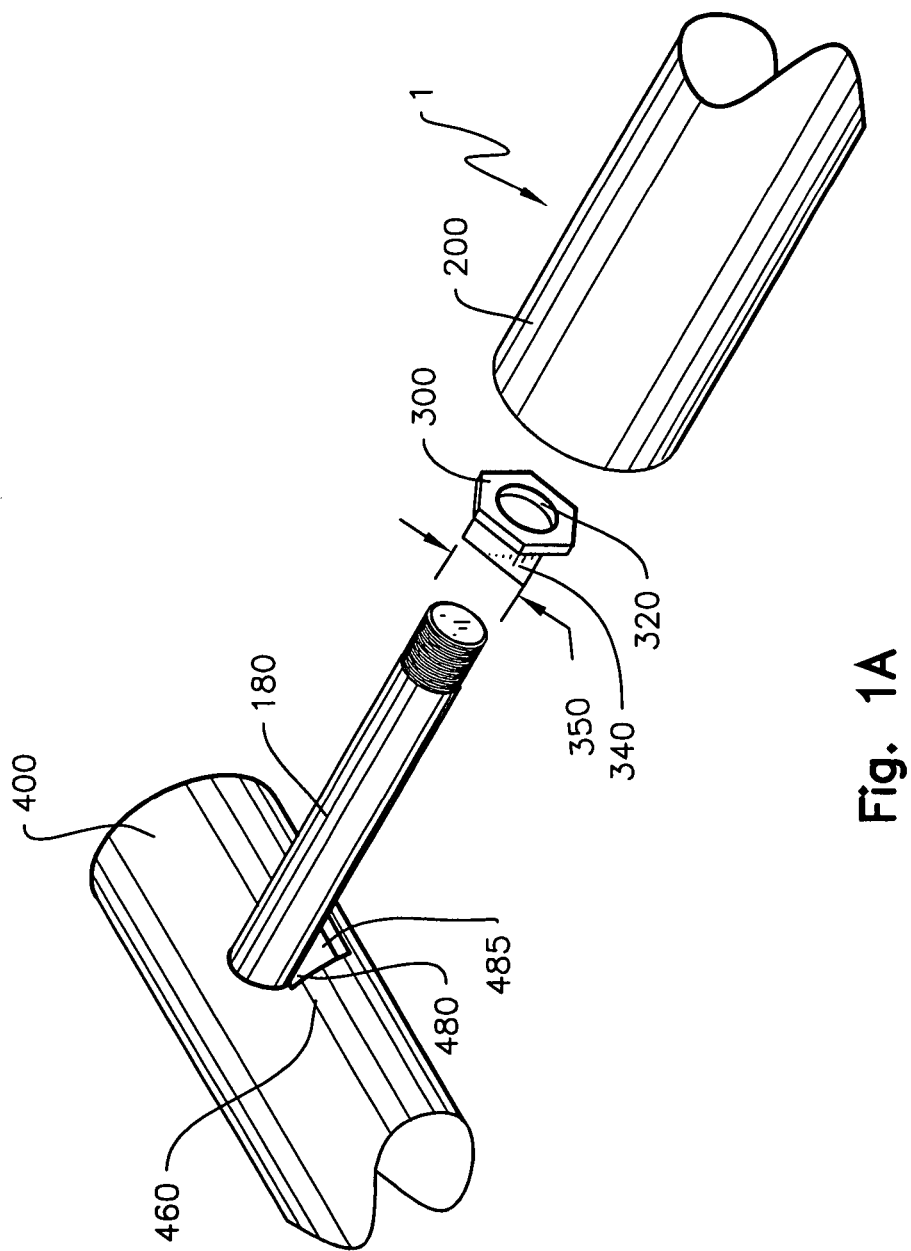
FIG. 1A illustrates the detail 1A from FIG. 1 showing frame or fork means (400), axle means (180), nut (300) with nut aperture (320) and drop out key (340), drop out key width (350) and roller peg (1) with cover bearing.
Figure 7:
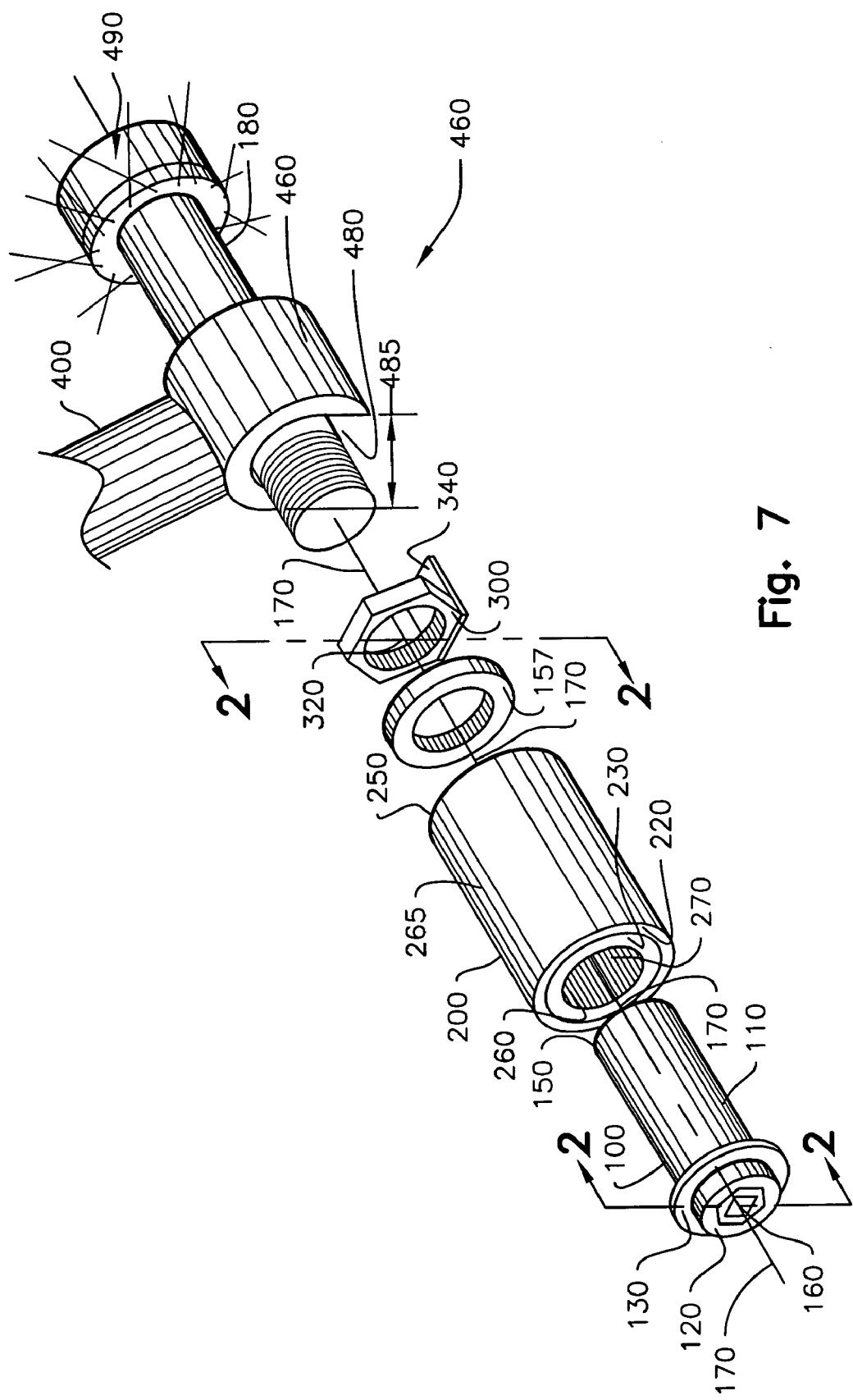
FIG. 7 is an exploded view of the roller peg (1) illustrating, in addition to what is shown in FIG. 2, mandrel second end washer (157), cover bearing aperture shoulder (230), cover bearing aperture (260) and cover bearing aperture inside surface (270). Also illustrated is the bicycle frame or fork means (400), a fork end (440), fork bracket (460), slot means (480), slot width (485) and wheel spokes (490).

FIGS. 1, 1A, 2, 3, 4, 5, 6, 6A and 7 illustrate the roller peg (1) showing a mandrel (100) having a mandrel surface (110), a mandrel first end (120) and a mandrel second end (150). Seen is a mandrel flange means (130) which is proximal the mandrel first end (120). Also seen is the mandrel bore means (160), which may be smooth or threaded, extending from the mandrel second end (150) toward and proximal the mandrel first end (120). Also seen is socket means provided by a mandrel socket cap (122), mandrel hex nut (124) and mandrel socket drive (126), at the mandrel first end (120), providing means of tightening the mandrel to the threaded axle (180).

Also seen in FIGS. 1 through 7 is the cover bearing (200) having a cover bearing first end (220) and a cover bearing second end (250). Seen is a cover bearing aperture (260), having a cover bearing aperture inside surface (270), from the cover bearing first end (220) to the cover bearing second end (250); the cover bearing (200) has a cover bearing outer surface (265) and is primarily circular in cross-section. The cover bearing aperture (260) is sized to rotatably receive, at the cover bearing aperture first end (220), the mandrel (100) at the mandrel second end (150); the cover bearing aperture inside surface (270) rotatably and bearingly receives the mandrel (100) at the mandrel surface (110). A mandrel axis (170) is centrally positioned from the mandrel first end (120) to the mandrel second end (150) and from the cover bearing first end (220) to the cover bearing second end (250).

Additionally, the cover bearing (200), proximal the cover bearing first end (220), is recessed forming a cover bearing aperture shoulder (230) proximal the cover bearing outer surface (265) and extending to the cover bearing inside surface (270) thereby forming a bearing surface sized to rotatably and bearingly receive the flange means (130).

A cover bearing hex recess (255) is formed at the cover bearing second end (250); the cover bearing hex recess (255) is formed to rotatably and bearingly receive a mandrel second end washer (157) and or fixedly receive a nut (300). It is seen that the nut (300) has a nut aperture (320), which is smooth or threaded, and; the nut (300) having or not having a drop out key (340). It will be appreciated that the user of the roller peg (1) will select the nut (300) with or without the drop out key (340) depending on the intent to have the cover bearing (200) rotate or remain stationary when grinding.

When the drop out key (340), with drop out key width (350) is utilized and received by the slot width (485) the cover bearing (200) will not rotate. When the nut (300) without drop out key (340) is used the cover bearing (200) will rotate. In the preferred embodiment the slot width (485) receives the drop out key (340) with drop out key width (350) and precludes rotation of the nut (300) and, by means of the nut (300) being received into the cover bearing hex recess (255), rotation of the cover bearing (200). The slot width (485) receives the drop out key width (350) so as to preclude rotation.

The nut aperture (320), the cover bearing aperture (260) and the mandrel bore means (160) are concentric with the mandrel axis (170). The drop out key (340) is generally planar extending outwardly from the nut (300) distal to the nut aperture (320) and generally aligned with the mandrel axis (170) and orthogonal to the nut (300). The drop out key (340) has, distal to the nut aperture (320), a drop out key width (350). The nut aperture (320) and mandrel second end washer (157) rotatably receives a bicycle threaded axle means (180). The mandrel bore means (160) and or the nut aperture (320) are threaded to fixedly receive the bicycle threaded axle means (180). In the preferred embodiment the mandrel bore means (160) is threaded.

The bore means (160), in the preferred embodiment, is comprised of a mandrel threaded bore (160). A mandrel socket cap (122) which forms socket means for wrench or socket head engagement for wrench rotation of the mandrel (100) for thread engagement of the bicycle threaded axle means (180) with either or both the mandrel threaded bore (160) and the nut (300).

Flange means (130), in the preferred embodiment is provided by a mandrel flange (130) extending outwardly from and generally orthogonal to the mandrel axis (170) and the mandrel surface (110).

The cover bearing (200) provides, in the preferred embodiment, the recess and bearing surface to bearingly receive the mandrel flange (130) and forming the cover bearing aperture shoulder (230) which is generally orthogonal to the mandrel axis (170) and the cover bearing outer surface (265). The cover bearing (200) is generally cylindrical.

The bicycle threaded axle means (180) is comprised of an axle (180) which is elongated and extends outwardly from a bicycle fork or frame means (400). In the preferred embodiment the bicycle fork or frame means (400) has a slot means (480) which fixedly receives the drop out key (340) wherein the drop out key width (350) is fixedly received. The bicycle fork or frame means (400) comprises a bicycle frame or fork blade (400). The bicycle frame or fork blade (400) has a bracket means (460) having slot means (480). The bicycle threaded axle (180) extends outwardly from the bicycle frame or fork blade (400) or through the slot means (480). In the preferred embodiment, the slot means (480) has a bracket slot width (485) distal to the bicycle threaded axle (180) which fixedly receives the drop out key (340). In the preferred embodiment the bicycle fork or frame means (400) is composed of a frame or fork end (440) forming a fork bracket (460) and having therein a fork bracket slot (480). The bicycle threaded axle (180) extends outwardly from the bicycle fork or frame means (400) or through the fork bracket slot (480). The fork bracket slot (480) has a fork bracket slot width (485) distal to the bicycle threaded axle (180) which fixedly receives the drop out key (340).

In the preferred embodiment the mandrel threaded bore (160) is threaded from the mandrel second end (150) toward the mandrel first end (120). At the mandrel first end (120) the mandrel socket cap (122) form a mandrel hex nut (124) and or a mandrel socket drive (126).

In the preferred embodiment the mandrel (1) is formed of rigid materials including metals, metal alloy, plastics and composite materials. The mandrel first end (120) has a machined or molded mandrel socket cap (122) offering a nut for socket or wrench operation and shown here as a mandrel hex nut (124) or a mandrel socket drive (126) for installing or removing the roller peg (1) from an axle. It will be appreciated that a number of nut configurations or drive receptacles, including for example Allen wrenches, will be equivalent to those described here and shown in the drawings.

The cover bearing (200) is formed of a rigid high impact material having bearing qualities including plastics, high impact polystyrene and metals. The cover bearing first end (220), cover bearing aperture shoulder (230), cover bearing second end (250), cover bearing hex recess (255) and cover bearing aperture (260) are formed by molding or machining. The cover bearing hex recess (255) is formed to fixedly receive a nut (300) such that rotation is precluded. A mandrel second end washer (157) may be interposed between the nut (300) and the cover bearing (200) thereby allowing a nut (300) with drop out key (340) to be utilized such that the nut (300) will bear on the mandrel second end washer (157) thus allowing the cover bearing (200) to rotate.

It will be appreciated that the roller peg (1) may be used in other axle type structures including, for example, conveyor systems and internal machine parts. Unlike the prior all art devices that are either continuously fixed or capable of rolling by use of sealed metal bearings, the device hereof enjoys the virtue of providing either fixed or roller action as selected by the user through the nature of the outer plastic cover bearing. The roller action, as mentioned throughout, affords enhanced operating performance and safety in terms of end user satisfaction in each area of potential use.

While a preferred embodiment of the present disclosure has been shown and described, it will be apparent to those skilled in the art that many changes and modifications may be made without departing from the disclosure in its broader aspects. The appended claims are therefore intended to cover all such changes and modifications as fall within the true spirit and scope of the disclosure.

The invention claimed is:

1. A roller peg (1) comprising:
   a. a mandrel (100) having a mandrel surface (110), a mandrel first end (120) and a mandrel second end (150); a flange (130) is proximal the mandrel first end (120); mandrel bore means (160), comprising a bore, from the mandrel second end (150) toward and proximal the mandrel first end (120); a socket provided by a mandrel socket cap (122) at the mandrel first end (120); the mandrel socket cap (122) forms a socket for wrench or socket head engagement for wrench rotation of the mandrel (100) for thread engagement of a bicycle threaded axle (180) with either or both the mandrel bore (160) and the nut (300);
   b. a cover bearing (200) having a cover bearing first end (220) and a cover bearing second end (250); a cover bearing aperture (260), having a cover bearing aperture inside surface (270), from the cover bearing first end (220) to the cover bearing second end (250); the cover bearing (200) has a cover bearing outer surface (265) and is primarily circular in cross-section;
   c. the cover bearing aperture (260) is sized to rotatably receive, at the cover bearing aperture first end (220), the mandrel (100) at the mandrel second end (150); the cover bearing aperture inside surface (270) rotatably and bearingly receives the mandrel (100) at the mandrel surface (110); a mandrel axis (170) is centrally positioned from the mandrel first end (120) to the mandrel second end (150) and from the cover bearing first end (220) to the cover bearing second end (250);
   d. the cover bearing (200), proximal the cover bearing first end (220), is recessed forming a cover bearing aperture shoulder (230) proximal the cover bearing outer surface (265) and extending to the cover bearing inside surface (270) forming a bearing surface sized to rotatably and bearingly receive the flange (130);
   e. a cover bearing hex recess (255) is formed at the cover bearing second end (250); the cover bearing hex recess (255) is formed to rotatably and bearingly receive a mandrel second end washer (157)-or fixedly receive said nut (300); the nut (300) having a nut aperture (320) which is smooth or threaded; the nut (300) having a drop out key (340);
   f. the nut aperture (320), the cover bearing aperture (260) and the mandrel bore (160) are concentric with the mandrel axis (170); the drop out key (340) is generally planar extending outwardly from the nut (300) distal to the nut aperture (320) and generally parallel with the mandrel axis (170) and orthogonal to the nut (300);
   g. the nut aperture (320) and the mandrel second end washer (157) rotatably receiving a bicycle threaded axle (180); the mandrel bore (160) is threaded and fixedly receives the bicycle threaded axle (180).

2. A roller peg (1) from claim 1 further comprising:
   a. the flange (130) extending outwardly from and generally orthogonal to the mandrel axis (170) and the mandrel surface (110); the flange (130) functioning to retain the cover bearing (200) relative to the mandrel (100); the recess and bearing surface forming the cover bearing aperture shoulder (230) is generally orthogonal to the mandrel axis (170) and the cover bearing outer surface (265);
   b. the cover bearing (200) is generally cylindrical;
   c. the bicycle threaded axle (180) comprised of an axle (180) which extends outwardly from a bicycle fork or frame (400); said bicycle fork or frame (400) having a slot (480) which fixedly receives the drop out key (340).

3. A roller peg (1) from claim 2 further comprising:
   a. the mandrel threaded bore (160) is threaded from the mandrel second end (150; toward the mandrel first end (120); the mandrel socket cap (122) forming a mandrel hex nut (124) and or a mandrel socket drive (126);
   b. the slot (480), being a narrow opening, having a bracket slot width (485) distal to the bicycle threaded axle (180) which fixedly receives the drop out key (340).

4. A roller peg (1) comprising:
   a. a mandrel (100);
   b. a cover bearing (200) having a cover bearing aperture (260),
   c. the cover bearing aperture (260) is sized to receive the mandrel (100) and rotatably and bearingly receives the mandrel (100); a flange (130) on the mandrel (100) bearingly and rotatably retains the cover bearing (200) in position relative to the mandrel (100);
   d. the mandrel having a threaded bore (160) from a mandrel second end (150) toward a mandrel first end (120); an axle (180) affixed by threads at the mandrel bore (160); a nut (300) having a nut aperture (320) which is smooth or threaded; the nut (300) having a drop out key (340) prevents rotation of at the cover bearing (200) relative to the axle (180);
   e. a recess (255) is formed at a cover bearing second end (250); the cover bearing recess (255) is formed to fixedly receive the nut (300); the nut aperture (320), the cover bearing aperture (260) and said mandrel bore (160) are concentric with a mandrel axis (170); the drop out key (340) is generally planar extending outwardly from the nut (300) distal to the nut aperture (320) and generally parallel with the mandrel axis (170) and orthogonal to the nut (300);

the bicycle threaded axle (180) extending outwardly from a bicycle fork or frame (400) or through a fork bracket slot (480); the fork bracket slot (480) having a fork bracket slot width (485) distal to the bicycle threaded axle (180) which fixedly receives the drop out key (340) at the drop out key width (350).

5. A roller peg (1) from claim 4 further comprising:
a. the mandrel (100) having a mandrel surface (110), a mandrel first end (120) and a mandrel second end (150); the flange (130) is proximal the mandrel first end (120); the mandrel bore (160) from the mandrel second end (150) toward and proximal the mandrel first end (120); the flange (130) functioning to retain the cover bearing (200) relative to the mandrel (100); a socket provided by a mandrel socket cap (122) at the mandrel first end (120); the mandrel socket cap (122) forms a socket for wrench or socket head engagement for wrench rotation of the mandrel (100) for thread engagement of the bicycle threaded axle (180) with either or both the mandrel threaded bore (160) and the nut (300);
b. the cover bearing (200) having a cover bearing first end (220) and a cover bearing second end (250); the cover bearing aperture (260), having a cover bearing aperture inside surface (270), from the cover bearing first end (220) to the cover bearing second end (250); the cover bearing (200) has a cover bearing outer surface (265) and is primarily circular in cross-section;
c. the cover bearing aperture (260) is sized to rotatably receive, at the cover bearing aperture first end (220), the mandrel (100) at the mandrel second end (150); the cover bearing aperture inside surface (270) rotatably and bearingly receives the mandrel (100) at the mandrel surface (110); a mandrel axis (170) is centrally positioned from the mandrel first end (120) to the mandrel second end (150) and from the cover bearing first end (220) to the cover bearing second end (250);
d. the cover bearing (200), proximal the cover bearing first end (220), is recessed forming a cover bearing aperture shoulder (230) proximal the cover bearing outer surface (265) and extending to the cover bearing inside surface (270) forming a bearing surface sized to rotatably and bearingly receive the flange (130).

6. A roller peg (1) comprising:
a. a mandrel (100) having a mandrel surface (110), a mandrel first end (120) and a mandrel second end (150); a flange (130) is proximal the mandrel first end (120); a mandrel bore (160), extending from the mandrel second end (150) toward and proximal the mandrel first end (120); said mandrel bore (160) is threaded; a socket provided by a mandrel socket cap (122) at the mandrel first end (120); the mandrel socket cap (122) forms a socket for wrench or socket head engagement for wrench rotation of the mandrel (100) for thread engagement of a bicycle threaded axle (180) with the mandrel threaded bore (160);
b. a cover bearing (200) having a cover bearing first end (220) and a cover bearing second end (250); a cover bearing aperture (260), having a cover bearing aperture inside surface (270), from the cover bearing first end (220) to the cover bearing second end (250); the cover bearing (200) has a cover bearing outer surface (265) and is primarily circular in cross-section;
c. the cover bearing aperture (260) is sized to rotatably receive, at the cover bearing aperture first end (220), the mandrel (100) at the mandrel second end (150); the cover bearing aperture inside surface (270) rotatably and bearingly receives the mandrel (100) at the mandrel surface (110); a mandrel axis (170) is centrally positioned from the mandrel first end (120) to the mandrel second end (150) and from the cover bearing first end (220) to the cover bearing second end (250);
d. the cover bearing (200), proximal the cover bearing first end (220), is recessed forming a cover bearing aperture shoulder (230) proximal the cover bearing outer surface (265) and extending to the cover bearing inside surface (270) forming a bearing surface sized to rotatably and bearingly receive the flange (130);
e. a cover bearing hex recess (255) is formed at the cover bearing second end (250); the cover bearing hex recess (255) is formed to fixedly receive a nut (300); the nut (300) having a nut aperture (320) which is smooth;
f. the nut aperture (320), the cover bearing aperture (260) and the mandrel bore (160) are concentric with the mandrel axis (170); a drop out key (340) is generally planar extending outwardly from the nut (300) distal to the nut aperture (320) and generally parallel with the mandrel axis (170) and orthogonal to the nut (300);
g. the nut aperture (320) and the mandrel second end washer (157) rotatably receiving a bicycle threaded axle (180); the mandrel bore (160) is threaded and fixedly receives the bicycle threaded axle (180).

7. A roller peg (1) from claim 6 further comprising:
b. the flange (130) extending outwardly from and generally orthogonal to the mandrel axis (170) and the mandrel surface (110); the flange-(130) functioning to retain the cover bearing (200) relative to the mandrel (100); the recess and bearing surface forming the cover bearing aperture shoulder (230) is generally orthogonal to the mandrel axis (170) and the cover bearing outer surface (265);
c. the cover bearing (200) is generally cylindrical;
d. the bicycle threaded axle (180) extends outwardly from a bicycle fork or frame (400); said bicycle fork or frame (400) having a slot means (480) which fixedly receives the drop out key (340).

8. A roller peg (1) from claim 7 further comprising:
a. the mandrel threaded bore (160) is threaded from the mandrel second end (150) toward the mandrel first end (120); the mandrel socket cap (122) forming a mandrel hex nut (124) and or a mandrel socket drive (126);
b. bicycle fork or frame (400) comprising a fork blade (400); the fork blade (400) has a bracket (460) having the slot (480); the bicycle threaded axle (180) extending outwardly from the fork blade (400) or (480).

9. A roller peg (1) from claim 8 further comprising:
a. (340); the fork slot (480) having a slot width (485) distal to the bicycle threaded axle (180) which fixedly receives the drop out key (340) at the drop out key width (350).

* * * * *